United States Patent
Umesh et al.

(10) Patent No.: US 8,189,528 B2
(45) Date of Patent: May 29, 2012

(54) BASE STATION AND METHOD FOR USE THEREIN

(75) Inventors: Anil Umesh, Yokohama (JP); Minami Ishii, Yokohama (JP); Takehiro Nakamura, Yokohama (JP); Takashi Suzuki, Ichikawa (JP)

(73) Assignee: NTT DoCoMo, Tokyo (JP)

( * ) Notice: Subject to any disclaimer, the term of this patent is extended or adjusted under 35 U.S.C. 154(b) by 293 days.

(21) Appl. No.: 11/917,874

(22) PCT Filed: Jun. 15, 2006

(86) PCT No.: PCT/JP2006/312060
§ 371 (c)(1),
(2), (4) Date: May 14, 2009

(87) PCT Pub. No.: WO2006/135020
PCT Pub. Date: Dec. 21, 2006

(65) Prior Publication Data
US 2009/0296620 A1    Dec. 3, 2009

(30) Foreign Application Priority Data
Jun. 17, 2005 (JP) ................................. 2005-178543

(51) Int. Cl.
*H04W 4/00* (2009.01)
(52) U.S. Cl. ........ 370/330; 370/328; 370/329; 370/331; 370/340; 370/341; 370/343; 370/349; 370/350
(58) Field of Classification Search .................. None
See application file for complete search history.

(56) References Cited

U.S. PATENT DOCUMENTS

| | | | |
|---|---|---|---|
| 2003/0223393 A1* | 12/2003 | Lee ................................ | 370/335 |
| 2005/0090278 A1* | 4/2005 | Jeong et al. ................... | 455/525 |
| 2005/0135317 A1* | 6/2005 | Ware et al. .................... | 370/338 |
| 2005/0207372 A1* | 9/2005 | Beckmann et al. ........... | 370/329 |
| 2005/0260992 A1* | 11/2005 | Moon et al. ................... | 455/436 |
| 2006/0135074 A1* | 6/2006 | Petrovic et al. ............ | 455/67.13 |

FOREIGN PATENT DOCUMENTS

| | | |
|---|---|---|
| JP | 11-055227 | 2/1999 |
| JP | 2004-229117 | 8/2004 |
| JP | 2004-343356 | 12/2004 |

OTHER PUBLICATIONS

3GPP TS 25.331 V6.4.0 (Dec. 2004) Technical Specification, 3rd Generation Partnership Project; Technical Specification Group Radio Access Network; Radio Resource Control (RRC); Protocol Specification (Release 6), 1119 pages.
Title page(s) of 3GPP TS 25.331 V6.4.0 (Dec. 2004) Technical Specification, 1 page.
International Search Report issued in PCT/JP2006/312060 and dated Aug. 8, 2006 (1 page).
Written Opinion issued in PCT/JP2006/312060, dated Aug. 8, 2006 (3 pages).

* cited by examiner

*Primary Examiner* — Jae Y Lee
(74) *Attorney, Agent, or Firm* — Osha Liang LLP

(57) ABSTRACT

A base station includes a multicast group administration unit administering a multicast group to which a mobile station belongs, a timing determination unit determining an inter-frequency measurement timing when the mobile station measures a signal having a frequency different from a frequency for a residing cell of the mobile station, and a transmission unit transmitting data. The timing determination unit assigns an uniform inter-frequency measurement timing for at least two mobile stations belonging to the same multicast group. The transmission unit transmits data to a mobile station within the multicast so as to avoid the inter-frequency measurement timing.

4 Claims, 14 Drawing Sheets

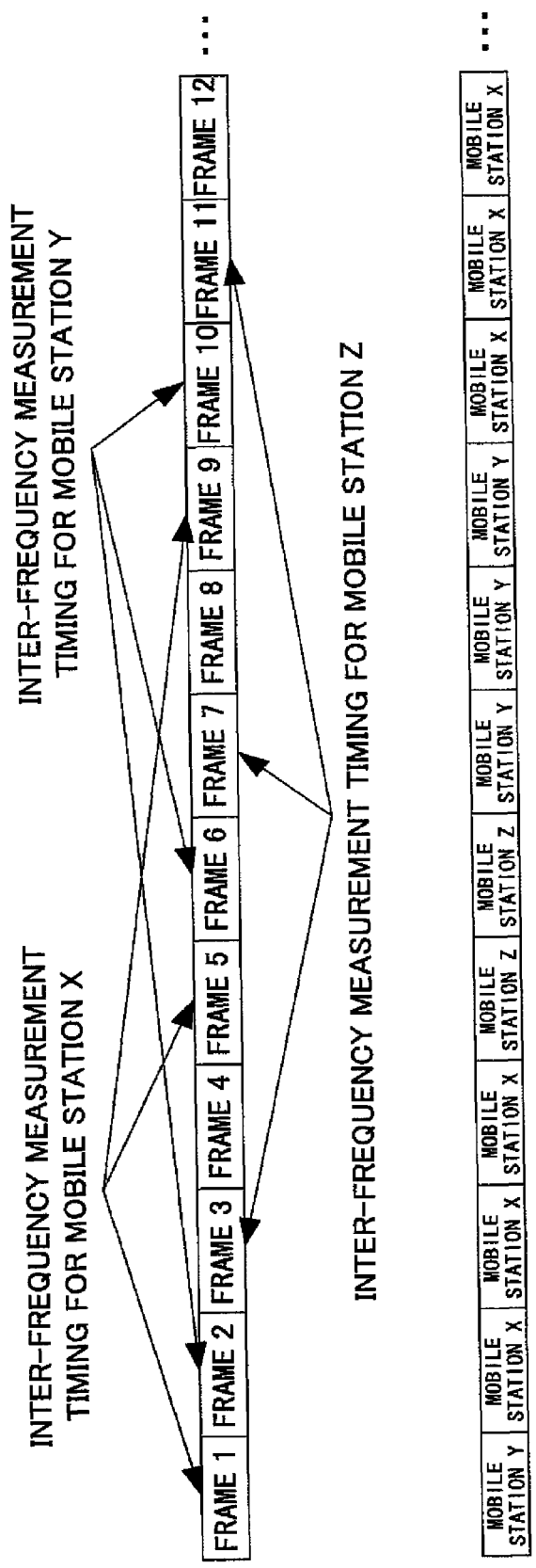

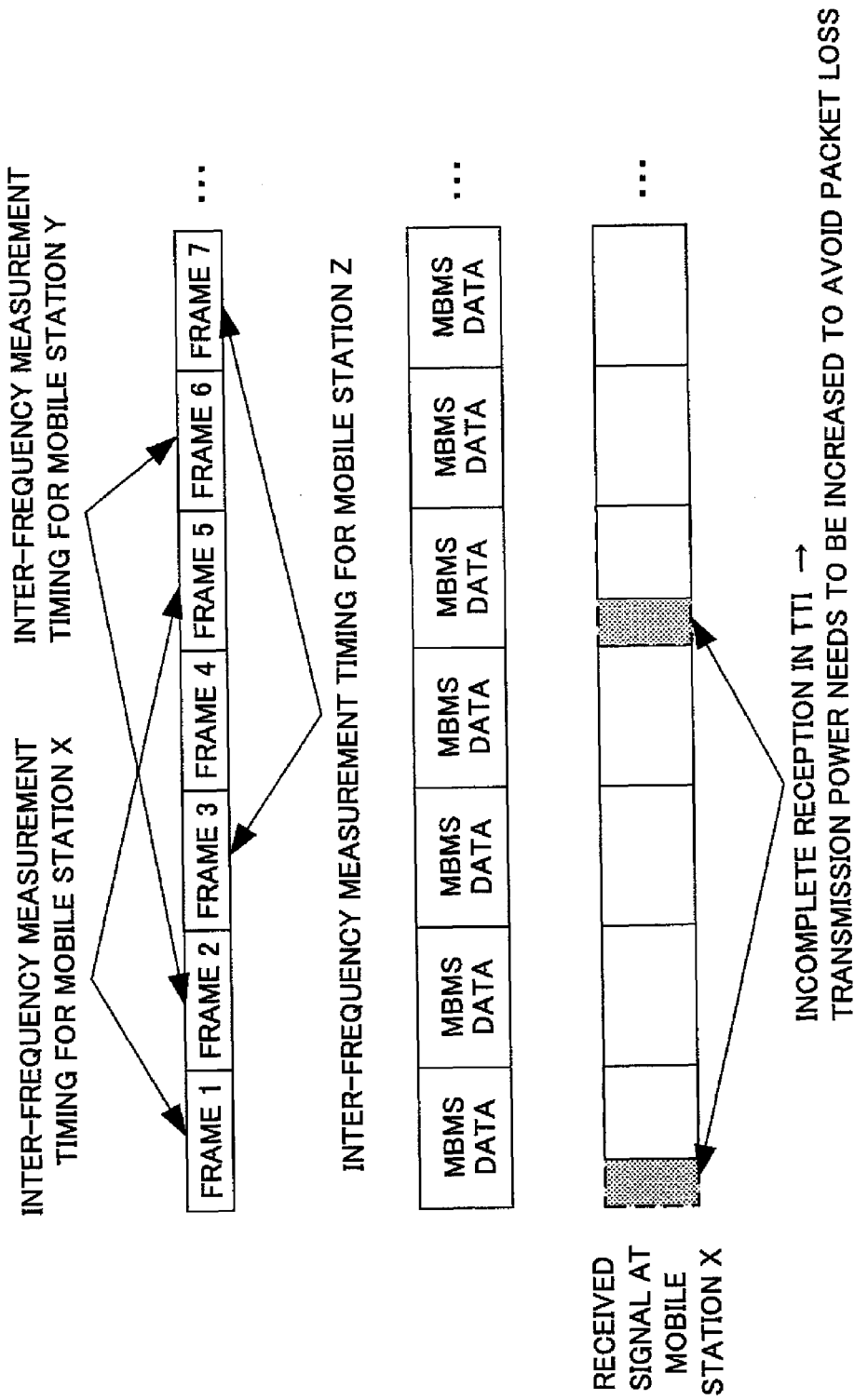

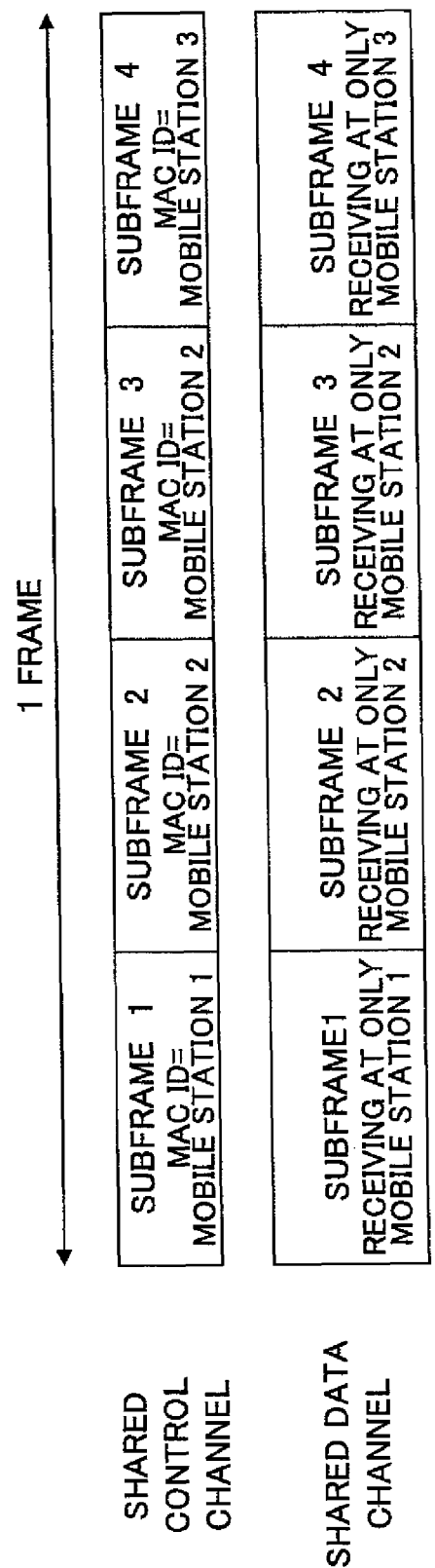

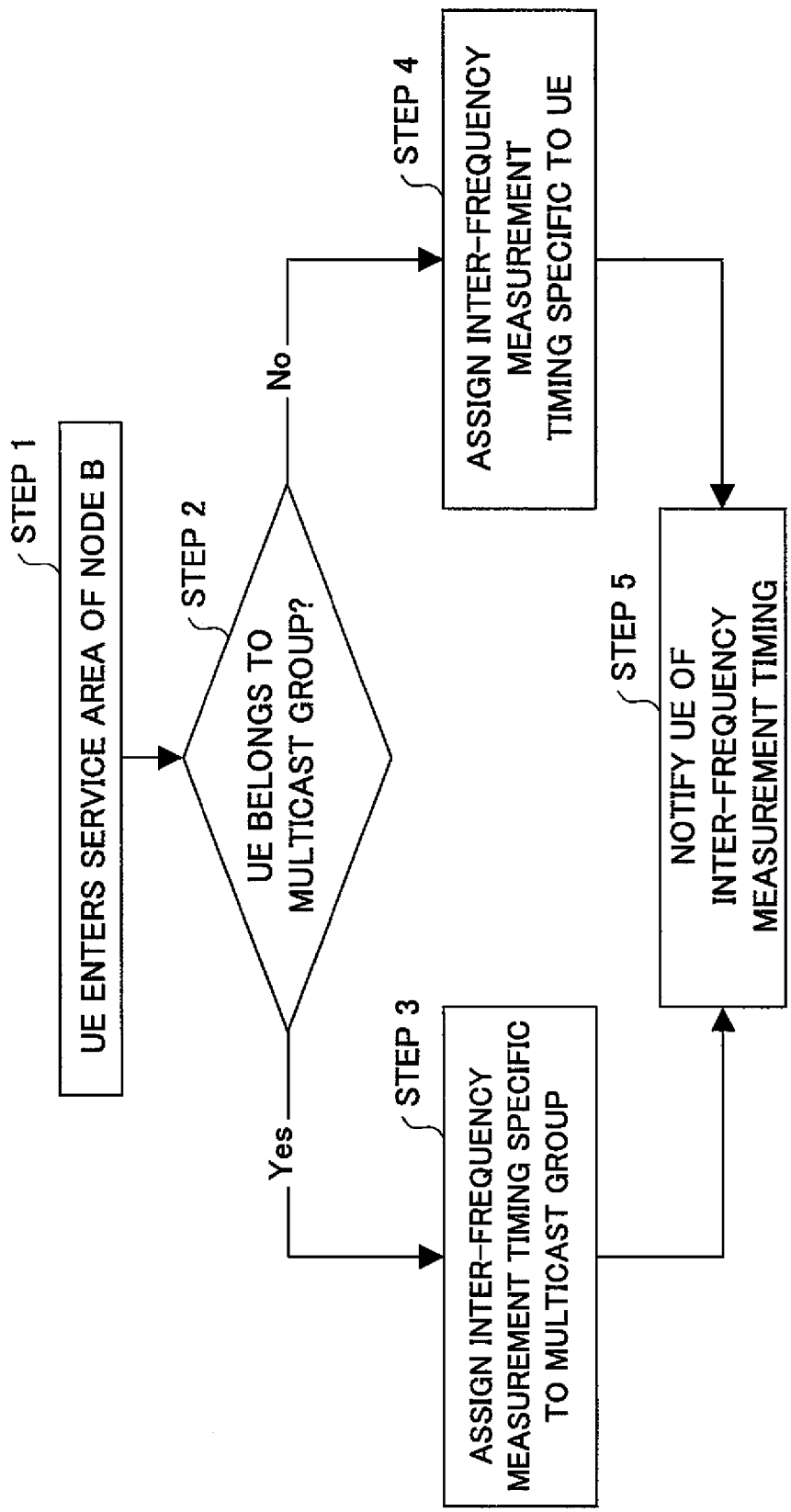

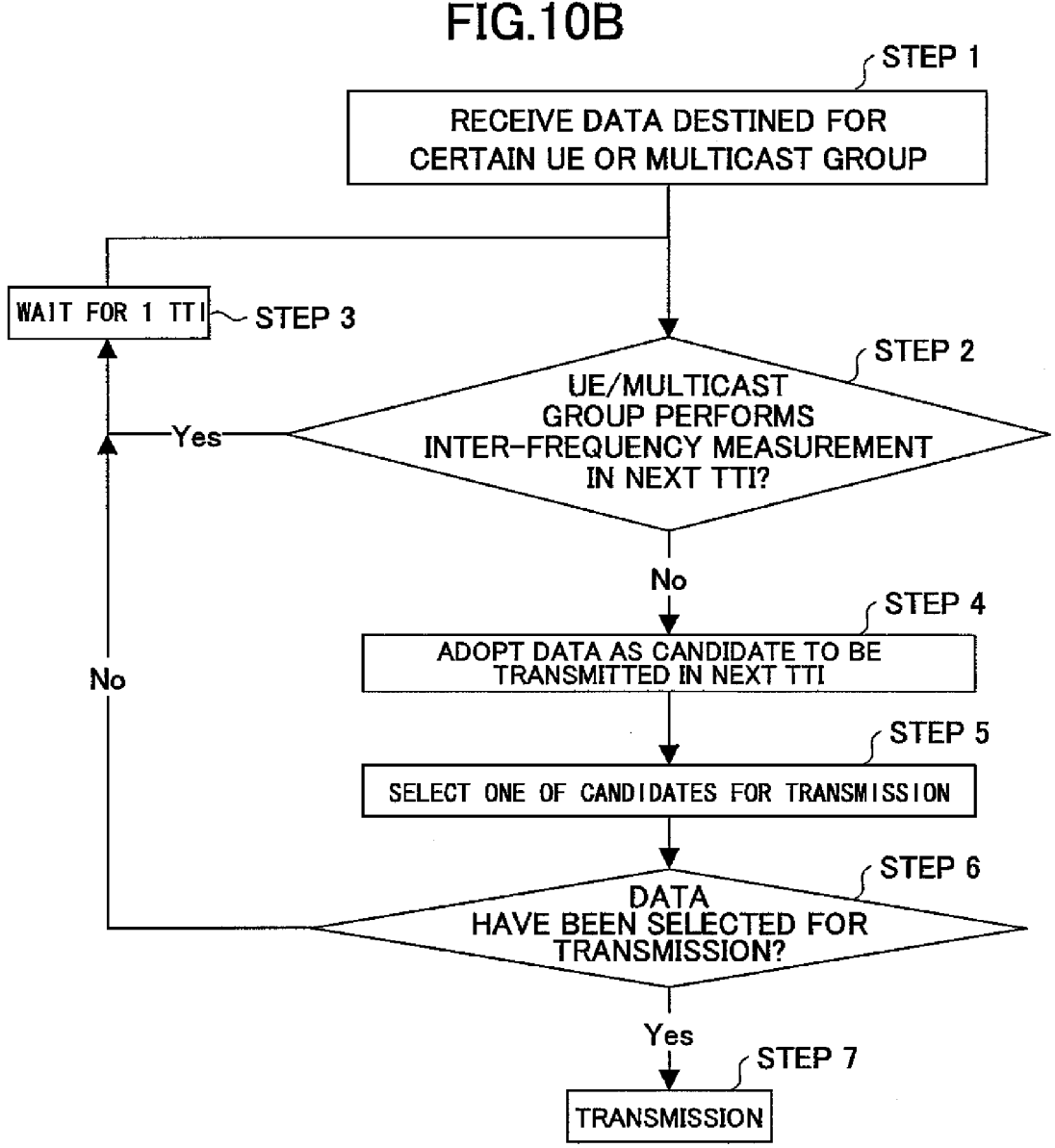

BASE STATION AND METHOD FOR USE THEREIN

TECHNICAL FIELD

The present invention generally relates to the technical field of mobile communications, and more particularly to a base station and a method for use therein.

BACKGROUND ART

In the Rel-6 specification of 3GPP, an international standardization organization for the $3^{rd}$ generation mobile communication systems, a multicast type service providing method is specified. In multicast type service providing methods, if multiple mobile stations within the same base station request a certain service (contents), instead of the certain contents being separately transmitted in assigned respective radio channels, the contents are transmitted by the base station in a downlink common channel and are simultaneously received in the common channel by all mobile stations that desire the reception. Such a feature may be generally referred to as "Multicast Broadcast Multimedia Service (MBMS)". The MBMS will be outlined below.

In the MBMS, as illustrated in FIG. 1, point-to-multipoint traffic channel (MTCH) data are transmitted in a secondary common control physical channel (S-CCPCH) from a base station in the transmission time interval (TTI) of 40 ms or 80 ms. In this example, the MTCH is configured as a logical channel where simultaneous contents are mapped. Also, the TTI represents the unit of radio transmission time of a channel-encoded data block, and the S-CCPCH is configured as a downlink physical channel for radio transmission of the MTCH.

Then, an exemplary inter-frequency measurement leading to degraded quality in the Rel-6 MBMS of the 3GPP will be described below. As illustrated in FIG. 2, if a radio network cannot cover all areas in the same frequency band, but if it can cover all the area using different frequency bands, a base station in one of the areas broadcasts to mobile stations that the residing cell is in a inter-frequency measurement area. In FIG. 2, the notations "f1" and "f2" represent different frequency bands, and some shaded cells correspond to inter-frequency measurement areas. If the reception power level falls below a broadcast threshold, mobile stations in these cells perform inter-frequency measurement.

In the inter-frequency measurement, a mobile station must receive a signal in a frequency band different from the frequency band received in its residing cell. Then, if the mobile station includes two RF paths as shown in FIG. 3A, the mobile station can perform the inter-frequency measurement simultaneously while receiving a signal destined for itself. However, installing such multiple RF paths may increase the cost of the mobile station. In practice, as illustrated in FIG. 3B, a single RF path is thus provided. Alternatively, the mobile station may perform the reception or measurement by tuning a frequency synthesizer to a desired carrier frequency; such a mobile station may be used in practice. In the inter-frequency measurement, the mobile station may tune a common frequency synthesizer to a desired frequency and receive no signal from its residing cell during the measurement.

As mentioned above, when a mobile station having a single RF path performs the inter-frequency measurement, it cannot receive any signal from its residing cell. Thus, a base station must know the inter-frequency measurement timings of the respective mobile stations and prevent downlink user data from being transmitted (DTX: Discontinuous Transmission) while the mobile stations are performing the inter-frequency measurement. In the 3GPP Rel-6 specification, the timing of the inter-frequency measurement by a mobile station is defined in accordance with the following formula;

$$\text{SFN div } N = C\_RNTI \bmod M\_REP + n*M\_REP.$$

The mobile station performs the inter-frequency measurement under the system frame number (SFN) satisfying the above formula. In the formula, "SFN" represents a frame number, "mod" represents a modulo operation, and "C_RNTI" represents a mobile station identifier assigned for the mobile stations in each cell. The parameters "N", "M_REP" and "n" are fixed. Thus, the inter-frequency measurement timings of the mobile stations are distributed in each cell in accordance with the above formula. In the formula, it is assumed that data for individual mobile station are transmitted from the base station to the respective mobile stations. In other words, as illustrated in FIG. 4A, when a certain mobile station performs the inter-frequency measurement, data reception by the other mobile stations is enabled. As a result, it is possible to prevent occurrence of any frame where data are not transmitted in the downlink. In non-patent document 1, this type of background technique is described.

As mentioned above, some method for distributing the timings of the inter-frequency measurements by mobile stations by performing some operation on the identifiers of the respective mobile stations may be suitable for transmission of dedicated data. However, such a method may be problematic if a multicast service is provided to multiple mobile stations in the form of multicast such as MBMS. In fact, since the mobile stations start the inter-frequency measurement at the respective timings, there may be no or little time period in which all mobile stations belonging to the same multicast group are not performing the inter-frequency measurement. For this reason, even if the base station transmits MBMS data, some collision may occur between the data transmission and the inter-frequency measurement, and a mobile station entering the inter-frequency measurement may not be able to receive a portion of a radio signal. Since MBMS data are channel-encoded in units of 40 ms or 80 ms and the different frequency measurement is performed in units of 10 ms, the mobile station may not be able to receive all data blocks transmitted during the different frequency measurement. In order to keep the loss rate of the data blocks equivalent to that in cells without the different frequency measurement, however, some compensation may be needed by such as increasing the transmission power of the base station corresponding to the transmission of the MBMS data. This situation is illustrated in FIG. 4B.

Non-patent document 1: 3GPP TS 25.331 V6.4.0 (2004-12), 8.5.11, pp. 243

DISCLOSURE OF INVENTION

Problem to be Solved by the Invention

The present invention addresses at least one of the above-mentioned problems. One object of the present invention is to provide a base station and a method for use in the base station wherein data loss caused by the inter-frequency measurement can be at least alleviated.

Means for Solving the Problem

According to an embodiment of the present invention, there is a base station including a multicast group administration unit administering a multicast group to which a mobile station belongs; a timing determination unit determining an inter-frequency measurement timing when the mobile station measures a signal having a frequency different from a frequency for a residing cell of the mobile station; and a transmission unit transmitting data. The timing determination unit assigns a uniform inter-frequency measurement timing for at least two mobile stations belonging to the same multicast group. The transmission unit transmits data to a mobile station within a multicast group in such a timing to avoid the different frequency measurement timing.

ADVANTAGE OF THE INVENTION

According to the embodiment of the present invention, it is possible to at least alleviate the data loss caused by the inter-frequency measurement.

BRIEF DESCRIPTION OF DRAWINGS

FIG. 4A shows exemplary scheduling of timings of the inter-frequency measurement;

FIG. 4B shows another exemplary scheduling of timing of the inter-frequency measurement;

FIG. 5 shows an exemplary downlink shared control channel and an exemplary shared data channel;

FIG. 7A shows an operation according to one embodiment of the present invention;

FIG. 10B shows another operation according to one embodiment of the present invention.

BEST MODE FOR CARRYING OUT THE INVENTION

In one embodiment of the present invention, if a base station instructs mobile stations belonging to a service area under the control of the base station to perform inter-frequency measurement, the base station controls the measurement timings to make the inter-frequency measurement timings of all mobile stations belonging to a multicast group uniform. As a result, it is possible to make efficient use of downlink radio resources for multicast type services.

[First Embodiment]

A first embodiment of the present invention will be described below.

In this embodiment, as illustrated in FIG. 5, a shared data channel is applied for transmission and reception of downlink user data. A base station notifies mobile stations of assignment of the shared data channel. This notification is carried out in a shared control channel where the mobile stations are identified by MAC identifiers.

Figure 1:
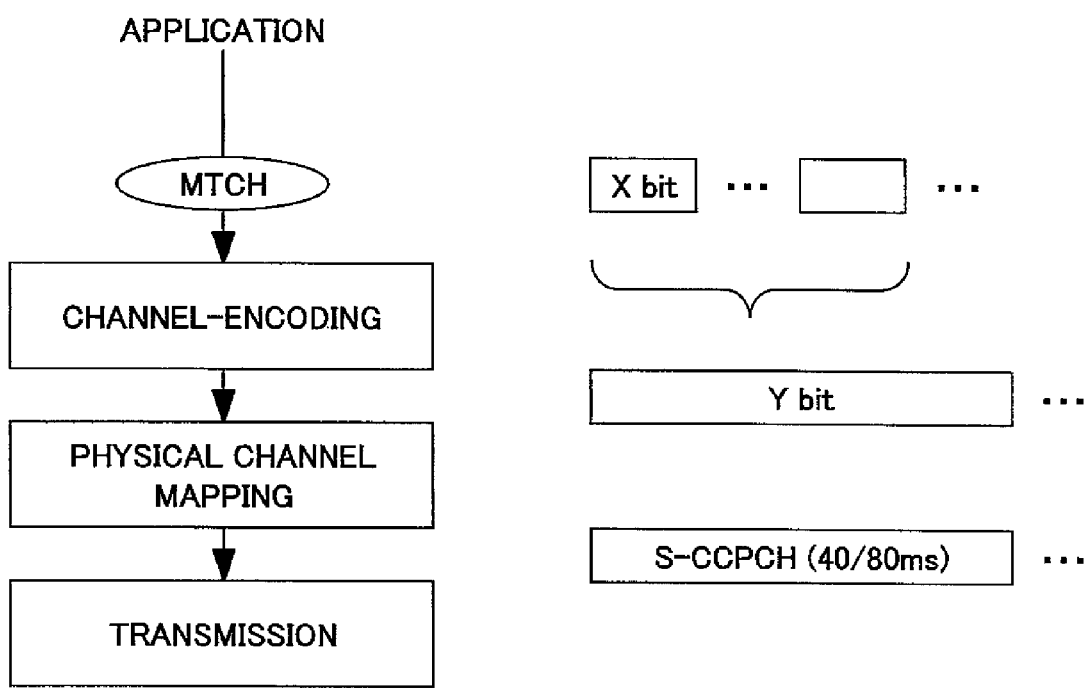
FIG. 1 shows an exemplary data flow in accordance with the MBMS.
Figure 2:
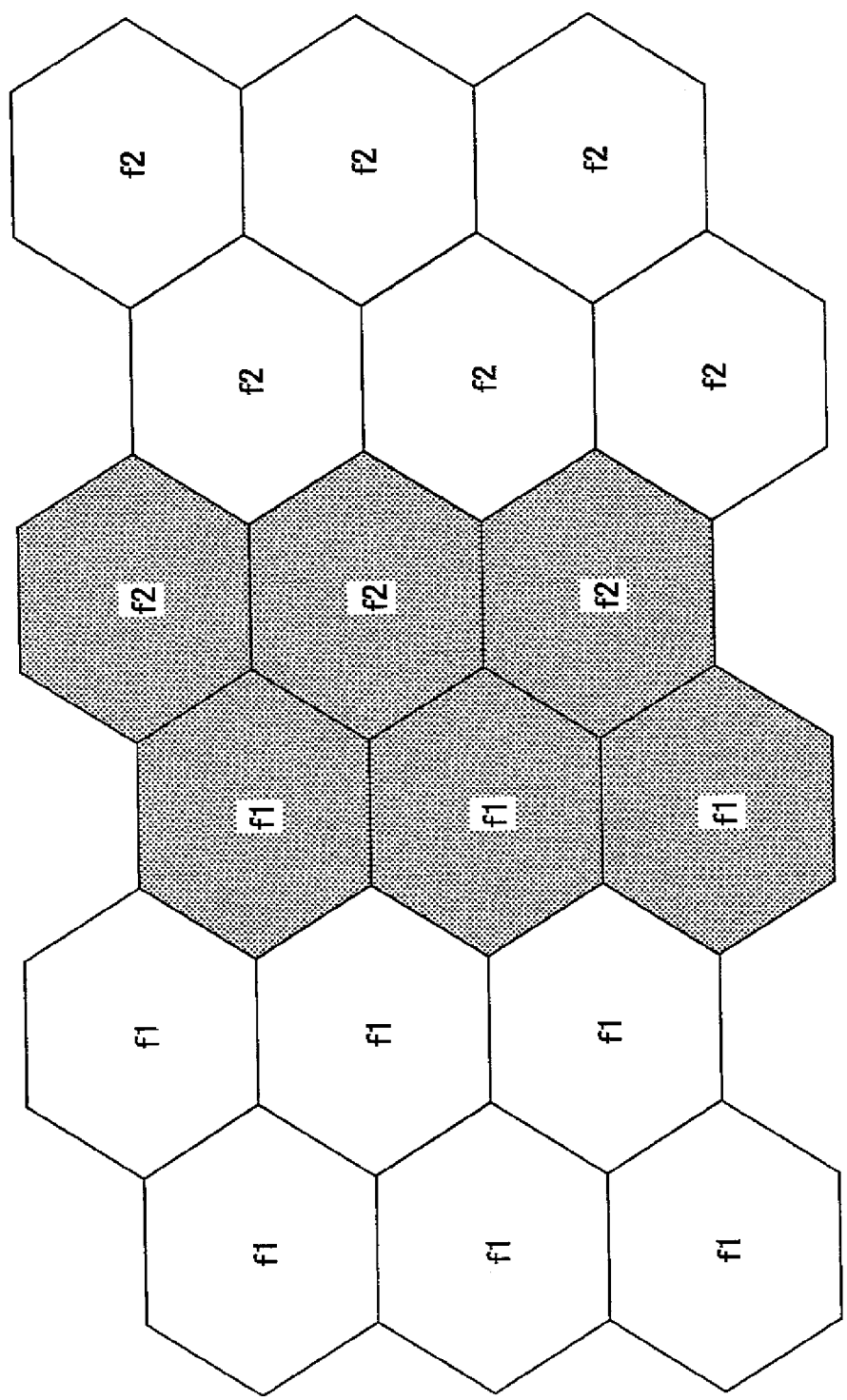
FIG. 2 shows an exemplary cell configuration of cells with and without the inter-frequency measurement.
Figure 3A:
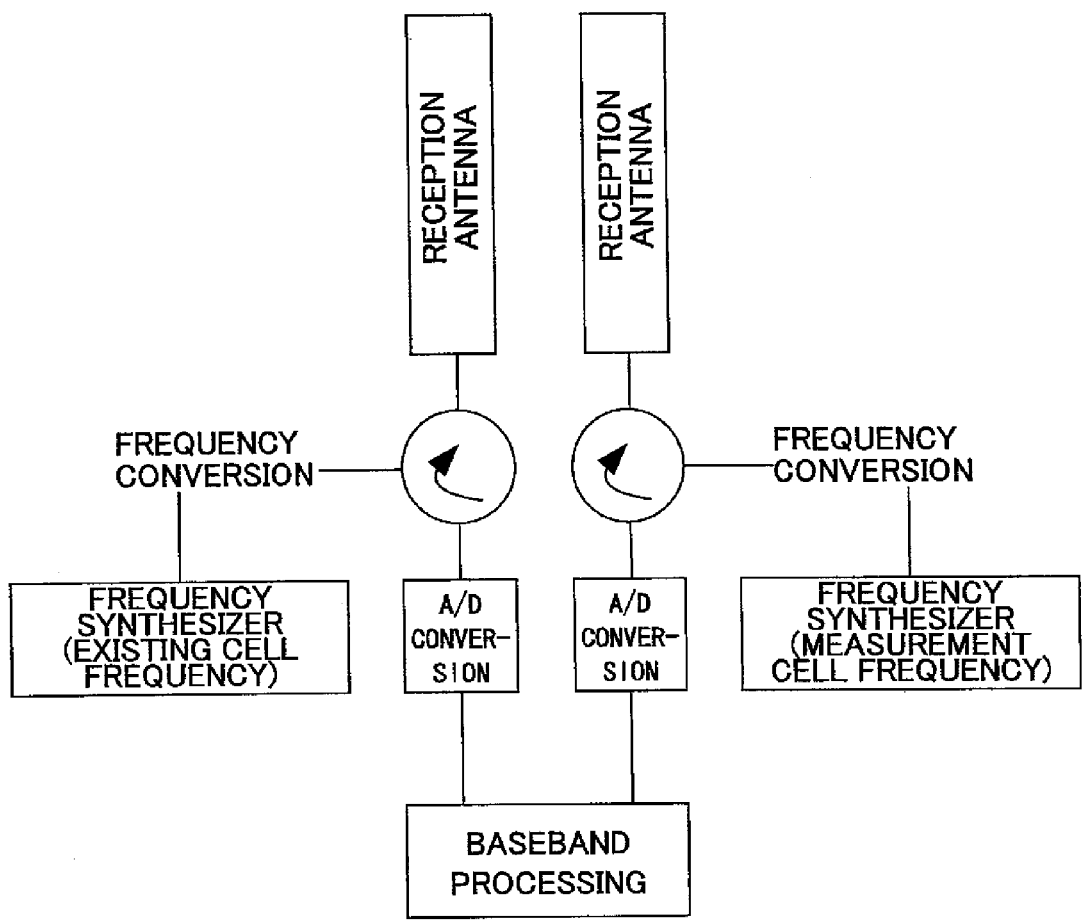
FIG. 3A shows an exemplary reception unit of a mobile station.
Figure 3B:
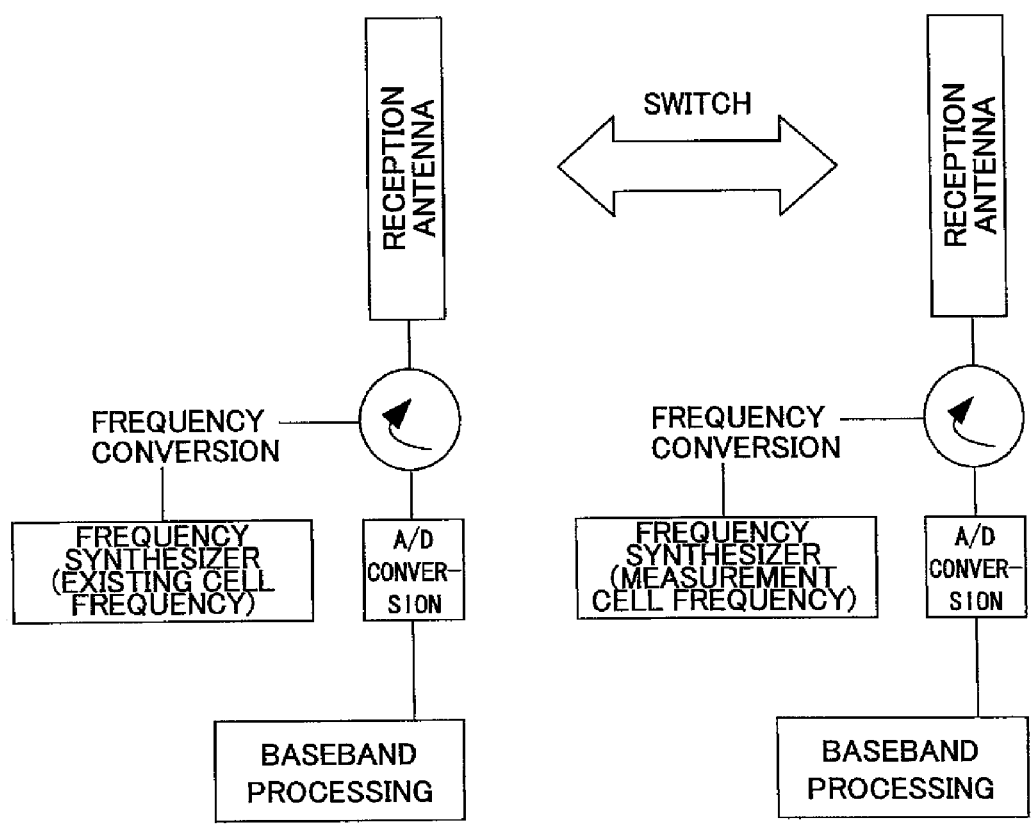
FIG. 3B shows another exemplary reception unit of a mobile station.
Figure 6:
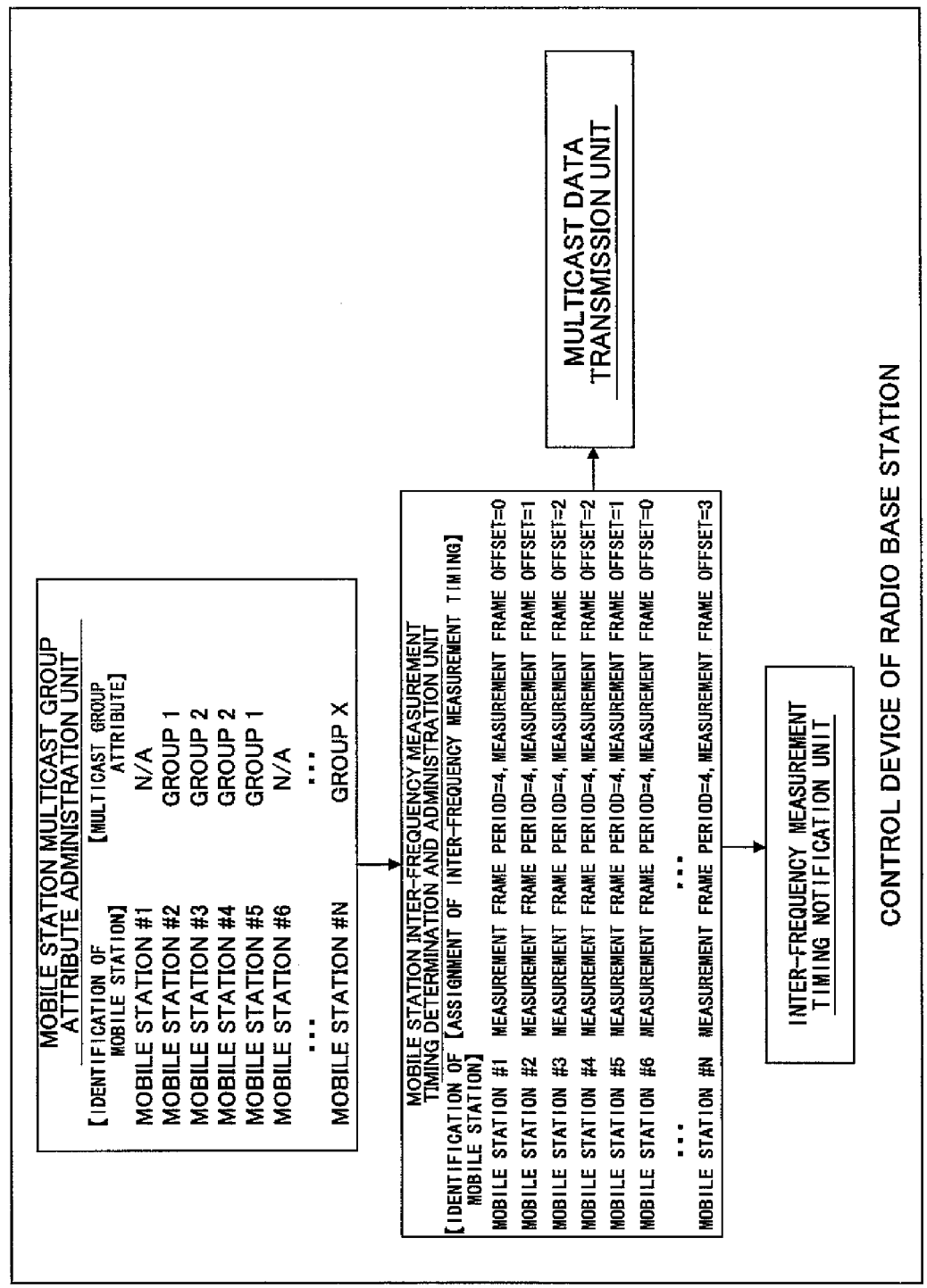
FIG. 6 is a functional block diagram illustrating a control device of a base station.

FIG. 6 is a functional block diagram illustrating a control device of a base station according to this embodiment. The control device of the base station illustrated in FIG. 6 includes a mobile station multicast group attribute administration unit, a mobile station inter-frequency measurement timing determination and administration unit, an inter-frequency measurement timing notification unit and a multicast data transmission unit. The mobile station multicast group attribute administration unit determines whether a mobile station belongs to a multicast group and administers multicast groups that mobile stations may belong to. The mobile station inter-frequency measurement timing determination and administration unit determines and administers the timing of the inter-frequency measurement for mobile stations. The inter-frequency measurement timing notification unit notifies the mobile stations of the inter-frequency measurement timings. The multicast data transmission unit transmits multicast data.

Figure 7B:
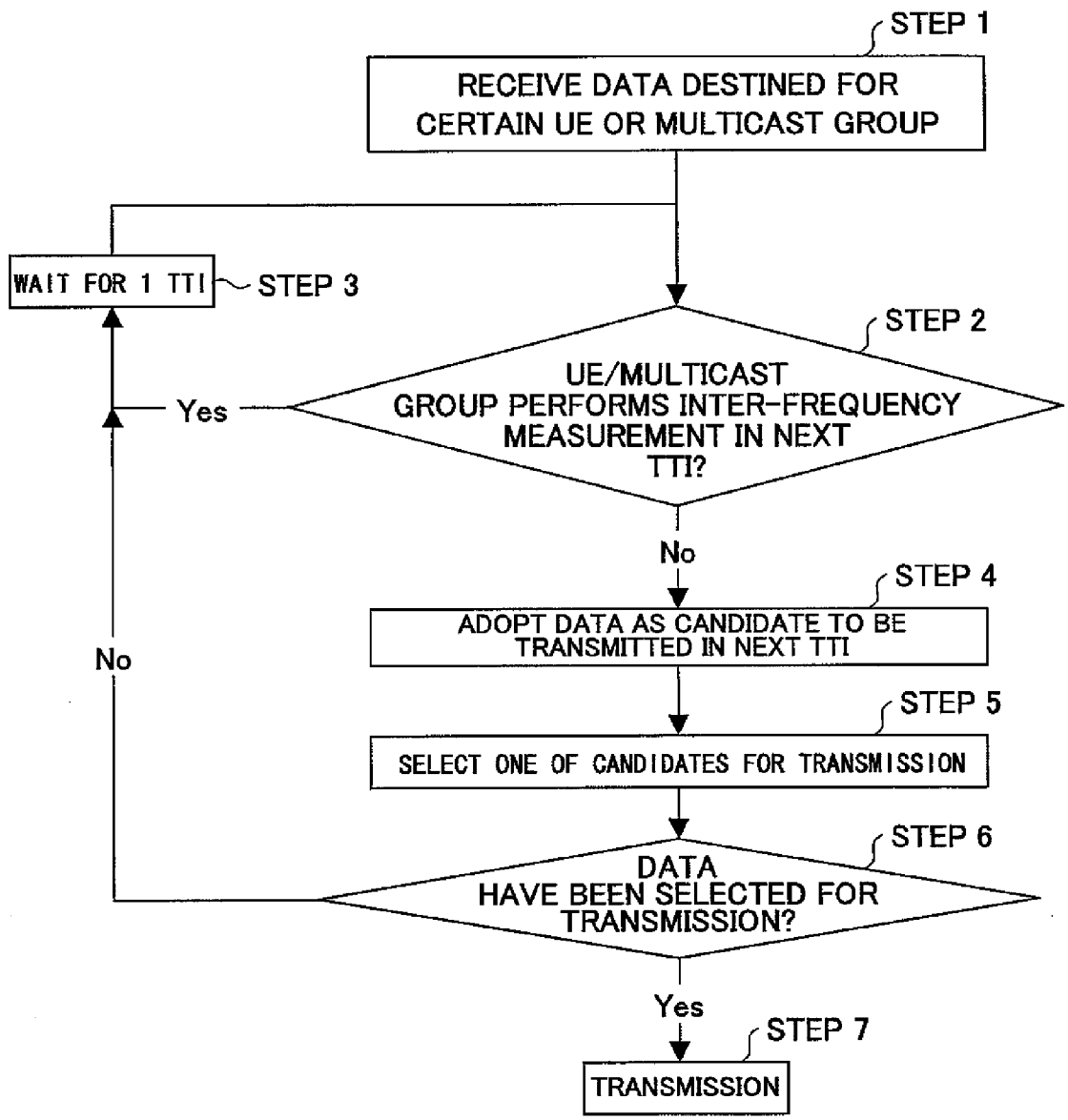
FIG. 7B shows another operation according to one embodiment of the present invention.

FIGS. 7A and 7B are flowcharts illustrating operations according to embodiments of the present invention. As illustrated in FIG. 7A, the control device of the base station, if a mobile station enters the service area of the base station (step 1), first determines whether the mobile station belongs to a multicast group (step 2). If the mobile station belongs to some multicast group, the control device determines which multicast group the mobile station belongs to. These steps are managed by the mobile station multicast group attribute administration unit. For example, the mobile station directly notifies the base station of this information. Alternatively, if the mobile station moves in from the service area of an adjacent base station, the adjacent base station may notify the base station of the information.

Then, the mobile station multicast group attribute administration unit notifies the mobile station inter-frequency measurement timing determination and administration unit of an attribute of the multicast group of the mobile station. The mobile station inter-frequency measurement timing determination and administration unit, if the mobile station belongs to some multicast group, assigns an inter-frequency measurement timing for the multicast group for the mobile station (step 3). On the other hand, if the mobile station does not belong to any multicast group, the mobile station inter-frequency measurement timing determination and administration unit assigns a dedicated inter-frequency measurement timing for the mobile station (step 4). In either case, the inter-frequency measurement timing notification unit notifies the mobile station of the assigned timing (step 5). In this embodiment, the inter-frequency measurement timing may differ between mobile stations that do not belong to any multicast group or between mobile stations that belong to different multicast groups. However, the same inter-frequency measurement timing should be assigned for mobile stations that belong to the same multicast group. Typically, such a method of specifying the inter-frequency measurement timing may include some method of specifying the timing, for example, through the measurement frame period and the measurement frame offset.

As illustrated in FIG. 7B, if data destined for a certain multicast group occur (step 1), the mobile station inter-frequency measurement timing determination and administration unit determines the inter-frequency measurement timing of the multicast group, and the multicast data transmission unit transmits the multicast data in a TTI when the inter-frequency measurement timing of the multicast group does not overlap. The base station determines whether the mobile station or the multicast group is to perform the inter-frequency measurement in the next TTI (step 2). If so, the control proceeds to step 3 and returns to step 2 after waiting for one TTI. Otherwise, the data are handled as a candidate to be transmitted in the next TTI (step 4), and data to be transmitted are selected among the candidates (step 5). Then, it is determined whether the data have been selected for transmission. If not, the process waits for one TTI (step 3), and then the control returns to step 2. Otherwise, the data are transmitted (step 7).

In this manner, the inter-frequency measurement timing of a multicast group is made uniform, and thus all mobile stations belonging to the multicast group can perform the inter-frequency measurement appropriately and receive multicast data without loss of data. As a result, it is possible to make efficient use of downlink radio resources.

[Second Embodiment]

Figure 8:
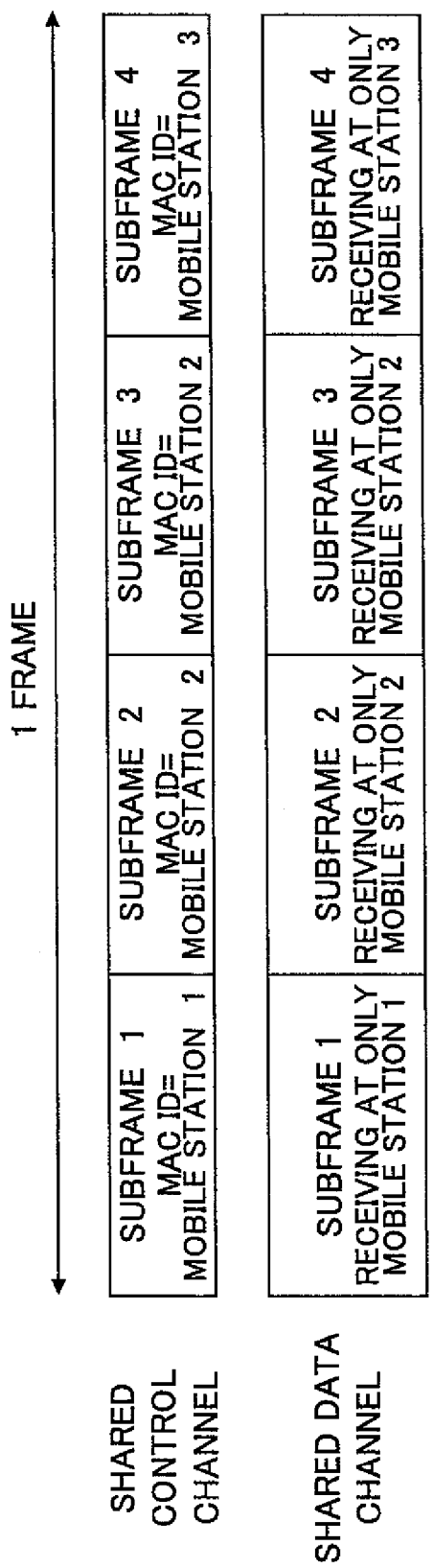
FIG. 8 shows an exemplary downlink shared control channel and an exemplary shared data channel.

A second embodiment of the present invention will be described below. In this embodiment, as illustrated in FIG. 8, a shared data channel is applied for transmission and reception of downlink user data. A base station notifies mobile stations of assignment of the shared data channel in a shared control channel. The mobile stations are identified by MAC identifiers within the control channel.

Figure 9:
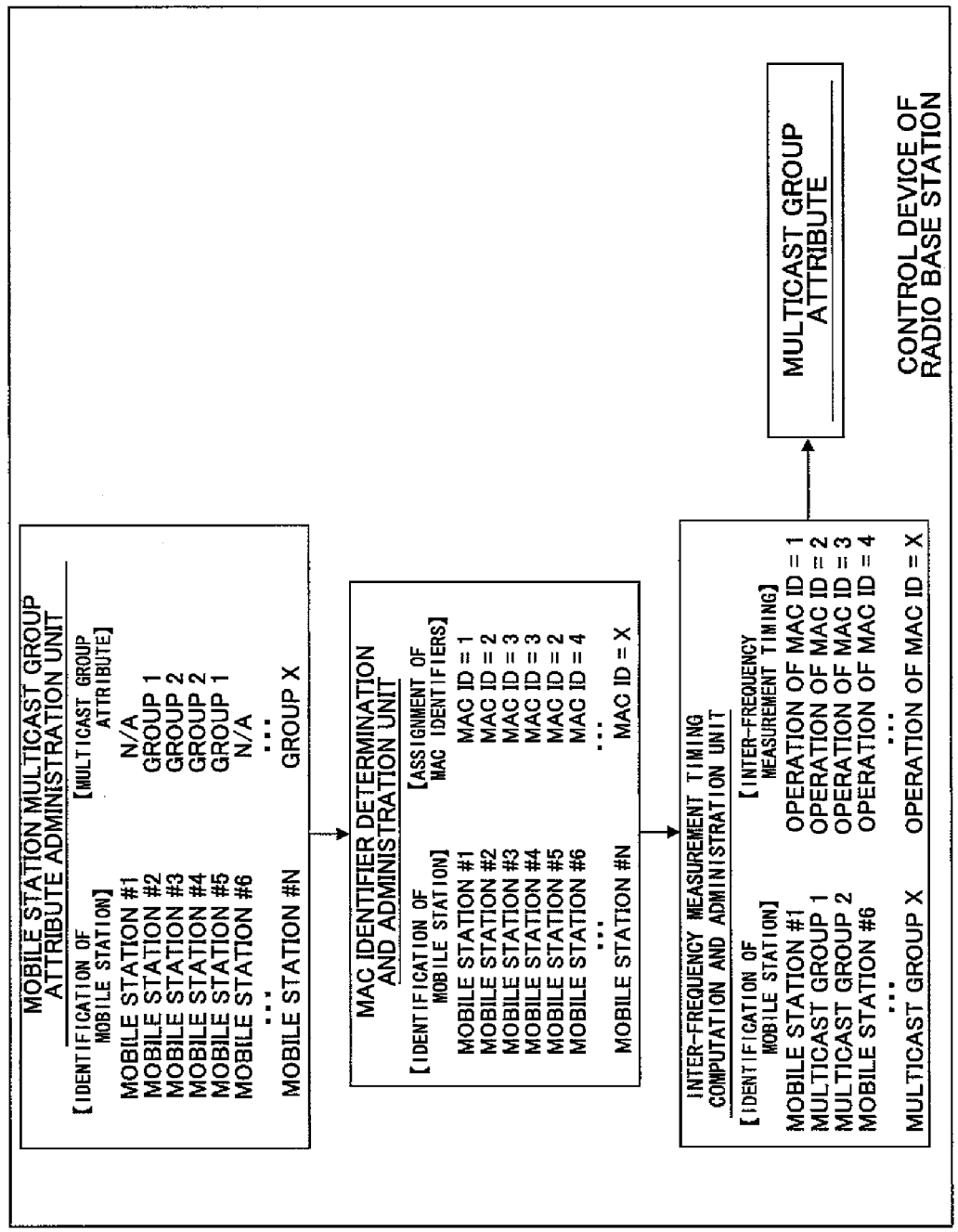
FIG. 9 is a functional block diagram illustrating a control device of a base station.

FIG. 9 is a functional block diagram illustrating a control device of a base station according to this embodiment. The control device of the base station illustrated in FIG. 9 includes a mobile station multicast group attribute administration unit, a MAC identifier determination and administration unit, a mobile station inter-frequency measurement timing computation and administration unit and a multicast data transmission unit. The mobile station multicast group attribute administration unit determines whether a mobile station belongs to some multicast group and if so, administers the multicast group. The MAC identifier determination and administration unit assigns MAC identifiers for mobile stations and administers the assigned MAC identifiers. The mobile station inter-frequency measurement timing computation and administration unit computes and administers the inter-frequency measurement timings based on the MAC identifiers. The multicast data transmission unit transmits multicast data.

Figure 10A:
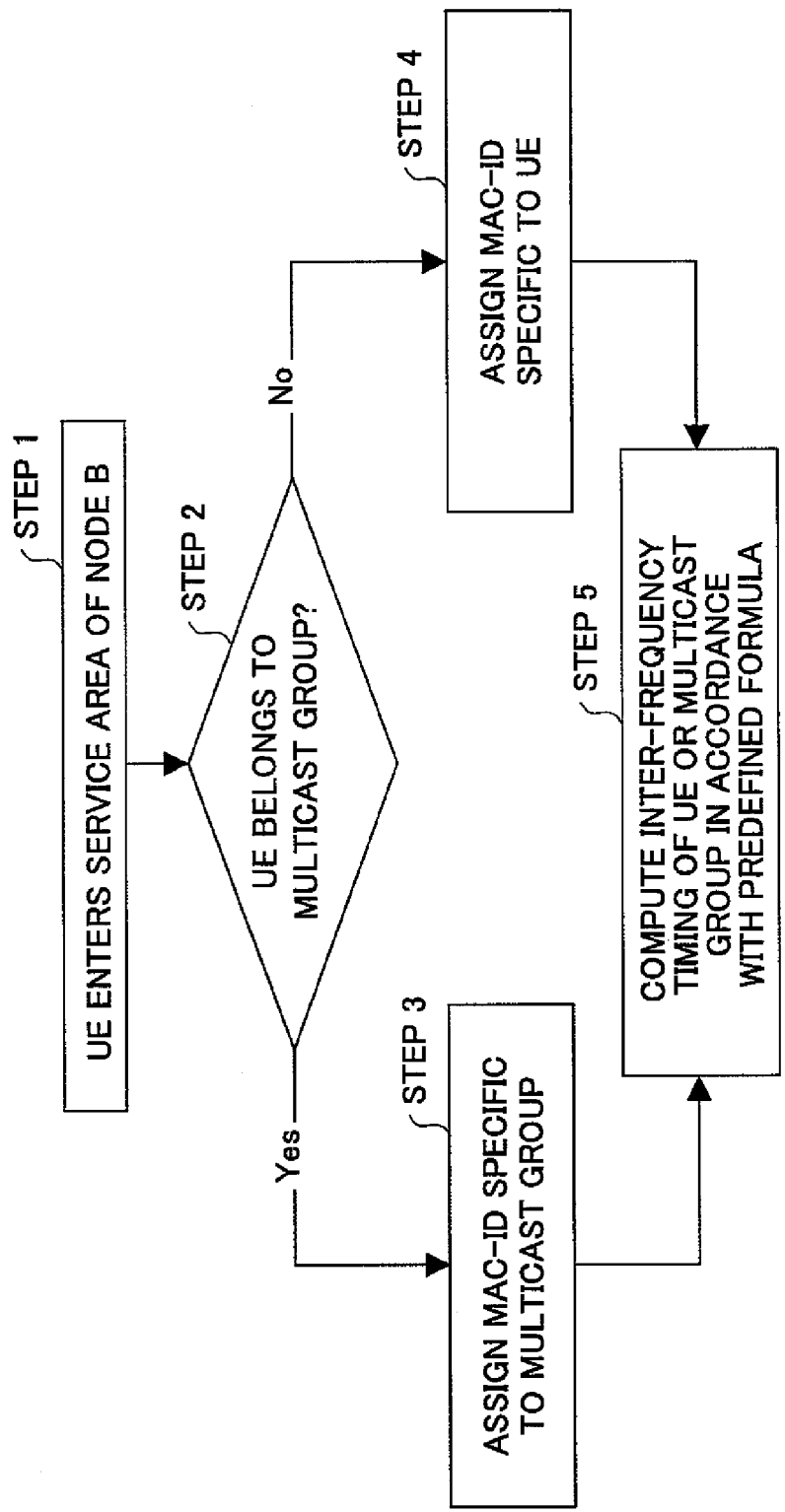
FIG. 10A shows an operation according to one embodiment of the present invention.

FIG. 10 includes flowcharts illustrating an operation according to this embodiment. As illustrated in FIG. 10A, the control device of the base station, if a mobile station enters the service area of the base station (step 1), determines whether the mobile station belongs to a multicast group (step 2). If the mobile station belongs to some multicast group, the mobile station multicast group attribute administration unit determines which multicast group the mobile station belongs to. For example, the mobile station may directly notify the base station of this information. Alternatively, if the mobile station moves in from the service area of an adjacent base station, the adjacent base station may notify the base station of the information.

Then, the mobile station multicast group attribute administration unit notifies the MAC identifier determination and administration unit of an attribute of the multicast group of the mobile station. If the mobile station belongs to some multicast group, the MAC identifier determination and administration unit assigns the MAC identifier for the multicast group to the mobile station (step 3). On the other hand, if the mobile station does not belong to any multicast group, the MAC identifier determination and administration unit assigns a dedicated MAC identifier for the mobile station and notifies the inter-frequency measurement timing computation and administration unit of it (step 4).

The inter-frequency measurement timing computation and administration unit computes and administers the inter-frequency measurement timing of the mobile station or the multicast group in accordance with a predefined formula depending on a MAC identifier (step 5). The mobile station also computes the inter-frequency measurement timing from the assigned MAC identifier in accordance with the same formula. In this embodiment, since the same MAC identifier is assigned for mobile stations belonging to a certain multicast group, the computed inter-frequency measurement timings are made uniform. Note that if the computed inter-frequency measurement timings are made uniform, different MAC identifiers may be assigned for the mobile stations.

Then, if data destined for a certain multicast group occur, the multicast data transmission unit receives the inter-frequency measurement timing of the multicast group from the inter-frequency measurement timing computation and administration unit and transmits the multicast data in a TTI when the inter-frequency measurement timing of the multicast group does not overlap.

As illustrated in FIG. 10B, if data destined for a mobile station or a multicast group occur (step 1), the base station determines whether the mobile station or the multicast group is to perform the inter-frequency measurement in the next TTI (step 2). If so, the control proceeds to step 3 and returns to step 2 after waiting for one TTI. Otherwise, the data are handled as a candidate to be transmitted in the next TTI (step 4), and data to be transmitted are selected among the candidates (step 5). Then, it is determined whether the data have been selected for transmission. If not, the process waits for one TTI (step 3), and then the control returns to step 2. Otherwise, the data are transmitted (step 7).

In this manner, the inter-frequency measurement timing of a multicast group is made uniform, and thus all mobile stations belonging to the multicast group can perform the inter-frequency measurement appropriately and receive multicast data without loss of data. As a result, it is possible to make efficient use of downlink radio resources.

This international patent application is based on Japanese Priority Application No. 2005-178543 filed on Jun. 17, 2005, the entire contents of which are hereby incorporated by reference.

The invention claimed is:

1. A base station comprising a control device, the control device comprising:
    a multicast group administration unit configured to administer one or more multicast groups to which a plurality of mobile stations belongs;
    a timing determination unit configured to determine inter-frequency measurement timings for the plurality of mobile stations; and
    a transmission unit configured to transmit multicast data to the plurality of mobile stations,
    wherein the timing determination unit assigns a uniform inter-frequency measurement timing for mobile stations belonging to the same multicast group of the administrated multicast groups,
    wherein the uniform inter-frequency measurement timing is at a timing different from inter-frequency measurement timing of mobile stations not belonging to the same multicast group, and
    wherein the transmission unit transmits the multicast data to the mobile stations belonging to the same multicast group at a timing different from the uniform inter-frequency measurement timing.

2. The base station as claimed in claim 1, wherein each of the plurality of mobile stations is identified by a MAC (Media Access Control) identifier.

3. The base station as claimed claim 1, wherein a uniform MAC (Media Access Control) identifier is assigned for the mobile stations belonging to the same multicast group, and the uniform inter-frequency measurement timing for the mobile stations belonging to the same multicast group is derived from the uniform MAC identifier.

4. A method for use in a base station wherein one or more multicast groups to which a plurality of mobile stations belong are administrated, comprising the steps of:

determining which of the administrated multicast groups the plurality of mobile stations belong to;

assigning inter-frequency measurement timings for the plurality of mobile stations;

transmitting multicast data to the mobile stations, wherein the assigning comprises assigning a uniform inter-frequency measurement timing for mobile stations belonging to the same multicast group of the administrated multicast groups, wherein the uniform inter-frequency measurement timing is at a timing different from inter-frequency measurement timing of mobile stations not belonging to the same multicast group, and wherein the transmitting comprises transmitting the multicast data to the mobile stations belonging to the same multicast group at a timing different from the uniform inter-frequency measurement timing.

* * * * *

UNITED STATES PATENT AND TRADEMARK OFFICE
CERTIFICATE OF CORRECTION

PATENT NO. : 8,189,528 B2
APPLICATION NO. : 11/917874
DATED : May 29, 2012
INVENTOR(S) : Anil Umesh et al.

It is certified that error appears in the above-identified patent and that said Letters Patent is hereby corrected as shown below:

On the Cover Page, item (73) Assignee, "NTT DOCOMO" should be

--NTT DOCOMO, INC.--.

Signed and Sealed this
Twelfth Day of February, 2013

Teresa Stanek Rea
*Acting Director of the United States Patent and Trademark Office*